July 5, 1955    J. E. MURPHY ET AL    2,712,383
CONTAINER TRAYS FOR FRUIT UNITS
Filed April 25, 1952    2 Sheets-Sheet 1

INVENTORS.
JOSEPH E. MURPHY
MURRAY SCHNALL
BY
ATTORNEY

July 5, 1955  J. E. MURPHY ET AL  2,712,383
CONTAINER TRAYS FOR FRUIT UNITS
Filed April 25, 1952  2 Sheets-Sheet 2

INVENTORS
JOSEPH E. MURPHY.
MURRAY SCHNALL
BY
ATTORNEY

United States Patent Office

2,712,383
Patented July 5, 1955

2,712,383

CONTAINER TRAYS FOR FRUIT UNITS

Joseph E. Murphy, Hicksville, and Murray Schnall, Brooklyn, N. Y., assignors to See-Qual Package Corp., Brooklyn, N. Y., a corporation of New York Application April 25, 1952, Serial No. 284,363

2 Claims. (Cl. 206—45.33)

This invention relates to containers, more particularly to wrapped container trays for housing one or more rows of fruit units.

A conventional form of package for rows of fruit units, such as tomatoes, comprises a thin flexible cardboard carton with a flat base and straight sides at right angles thereto, the carton being open at the top and completely enrobed in some transparent material, such as cellophane. This type, originally intended for selected fruit, because of the partial visibility feature, is frequently misused in tomato packaging, in that tomatoes are so placed therein that the generally scar-free blossom ends thereof are exposed to the cellophane side, whereas the stem ends which frequently contain scars and defects are placed against the solid opaque bottom of the container tray, with the result that an off-grade carton cannot be distinguished from a quality pack.

It is primarily within our contemplation to provide a novel form of container tray which will eliminate the possibility of the type of deceptive packing above referred to, by exposing to view substantially all sides of the packed fruit units while firmly maintaining them in position.

In the said conventional cardboard cartons, the square inside bottom corner construction does not present a satisfactory packing condition for such rounded or globular fruit units as tomatoes, there being no adequate support at said bottom corners for the rounded lower portions of the fruit. Wherever there is lateral contact the unit pressure is generally so great, particularly when a somewhat over-sized tomato is inserted, that there is a decided outward bulge in the carton. And if somewhat undersized tomatoes are deposited in the carton, there is no proper cradling thereof, resulting in a loose array, with consequent movement of the tomatoes during transit. This generally causes bruising and serious damage to the fruit. It is one of our objectives to overcome this shortcoming by providing a novel form of carton that will provide a relatively large seating and supporting area for the fruit units, thereby reducing the unit pressure load. And in this aspect of our invention it is another object to so form the seating and supporting members as to enable both slightly oversized and undersized tomatoes to be properly cradled and protected against displacement and injury.

In the modern method of machine wrapping of tomato cartons of said conventional form, there are frequent jammings of the filled cartons in the machines, due to the bulging sides of cartons containing oversized tomatoes. It is one of our objects to obviate the danger of this occurrence by our novel form of container.

Other objects, features and advantages will appear from the drawings and the description hereinafter given.

Referring to the drawings.

Figure 1:
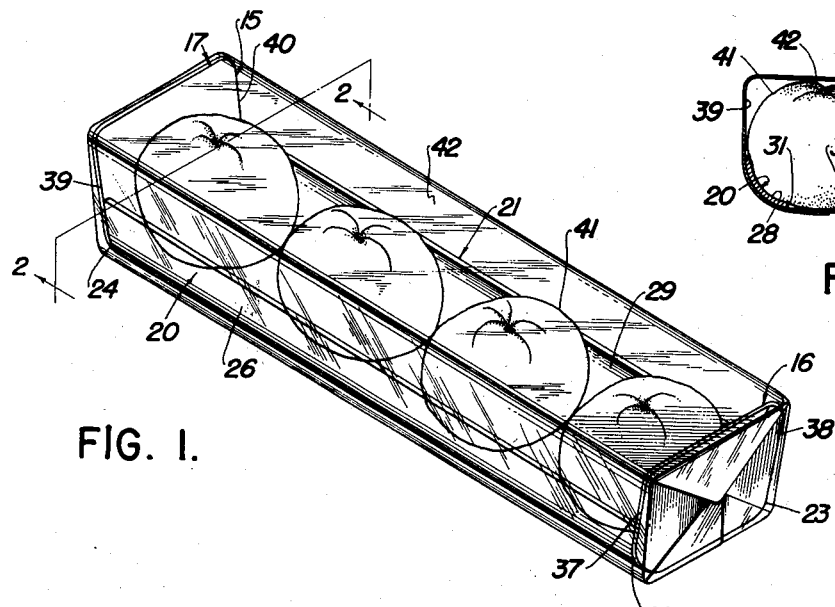
Figure 1 is a perspective view of one form of our invention, showing a row of tomatoes in the container tray enrobed in cellophane.

In the form of our invention illustrated in Figures 1 to 6, the container tray 15 comprises two end walls 16 and 17 sloping upwardly and outwardly, in divergent directions, from their respective bases 18 and 19—the opposite lower side portions of said walls being joined to the two lateral supporting walls or seat rails 20 and 21. In the preferred construction shown, the said lower side portions of the end walls comprise curved corner portions 22, 23 and 24, 25; and the said lateral supporting walls 20 and 21 have correspondingly curved outer surfaces 26 and 27, and inner seat surfaces 28 and 29, respectively. The said supporting walls 20 and 21 are in parallel, spaced relation, forming the bottom space 30 flanked by the bottom edges 31 and 32 of the respective walls 20 and 21. The upper inner portions 33 and 34 of said walls 20 and 21 are flared outwardly to meet the top edges 35 and 36, these being preferably, although not necessarily, at the level of the lowermost points of parallel edges 37 and 38, and 39 and 40 of the respective end walls 16 and 17.

The arrangement is hence such that the supporting walls 20 and 21 are adapted to receive, against the inner concave surfaces 28 and 28 thereof, a row of fruit units, such as the tomatoes 41 illustrated, whereby the said supporting walls serve as seat rails. With the fruit compactly in place, the filled container tray 15 can be wrapped, either manually or mechanically, with transparent wrapping paper 42. A package is thus presented which not only firmly holds the fruit against displacement, as will more clearly hereinafter appear, but also exposes both the tops and bottoms thereof to view—which is particularly desirable in the packaging of tomatoes when it is required to reveal both blossom and stem ends of the fruit. And where it is desired to expose substantially the entire packaged fruit, the walls 16, 17, 20 and 21 may, within the contemplation of our invention, be made of transparent material, such as some suitable moisture-proof plastic.

Figure 2:
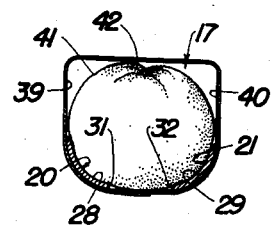
Figure 2 is a section of Figure 1 taken along line 2—2.
Figure 3:
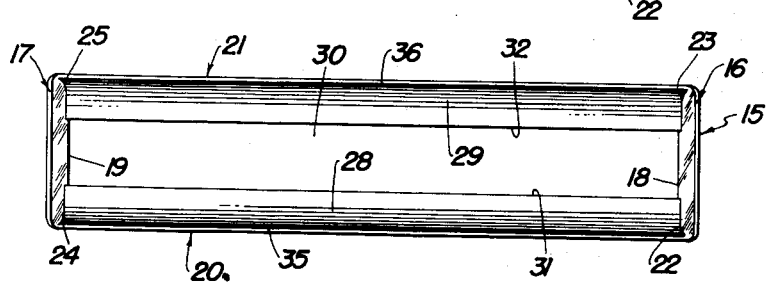
Figure 3 is a top view of Figure 1, with the tomatoes and wrapping removed.
Figure 4:
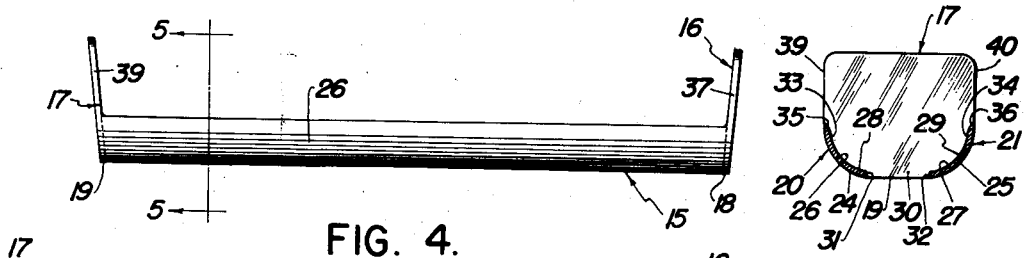
Figure 4 is a side view of Figure 3.
Figure 5:
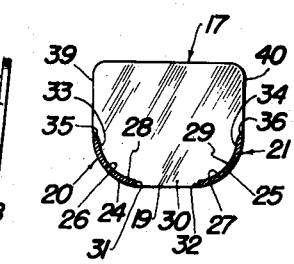
Figure 5 is a section of Figure 4 taken along line 5—5.

As will be noted from Figure 2, when the fruit is yieldable, as the tomato illustrated, it will conform to the general curvature of seat surfaces 28 and 29, and will rest substantially upon the entire surface of each of said surfaces. In this way the load is distributed over a relatively large area—considerably greater than in the case of conventional cartons whose side walls are perpendicular to the base. Even if a somewhat smaller tomato than the optimum size were to be inserted in the tray, it will settle down until the opposite lower outer side portions cradle into the seat surfaces 28 and 29, and yieldably conform to the concave configuration of said surfaces.

If the walls 16, 17, 20 and 21 are made, as is preferred, of relatively rigid plastic material, there will be no outward bulging of the package, thereby eliminating the danger of jamming in the wrapping machinery, as frequently occurs with the thin comparatively limp cardboard material used in conventional packages. Thus, both slightly oversized and undersized tomatoes will adjustably settle themselves upon the seat rails 20 and 21, and be cradled between the opposite seat surfaces 28 and 29 thereof, thereby forming a compact package, with the danger of movement within the tray and bruising the tomatoes reduced to a minimum.

Since the outer surfaces 26 and 27 are curved, as well as the corresponding corner portions 22, 23, 24 and 25 of the end walls 16 and 17, the operation of enrobing the tray with a wrapping covering will be facilitated, and will require less wrapping material than is necessary in square corner packages.

Figure 6:
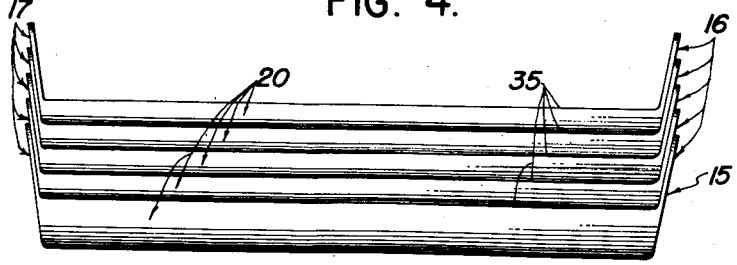
Figure 6 is a side view of a plurality of trays like that of Figure 4, shown in stacked formation.

The divergent slopes of walls 16 and 17 not only permit a slight longitudinal adjustment of a row of fruit units within the tray, but also facilitate the packing, shipping and storing of empty container trays 15, since stacking of such trays can readily be accomplished, as illustrated in Figure 6. The flared edges 33 and 34 coact with the sloping end walls 16 and 17 to permit a nesting of an upper tray deeper into the one below than would be the case if the upper edges of the supporting walls 20 and 21 were flat and equal to the thickness of the stock of said walls. The stacking of trays above described thus eliminates the complicated setting up and carton assembling procedure required with conventional carton blanks.

Figure 8:
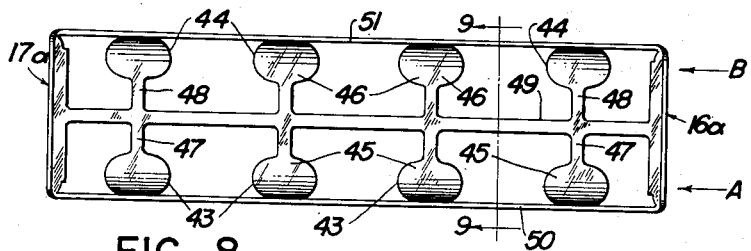
Figure 8 is a top view of Figure 7.
Figure 9:
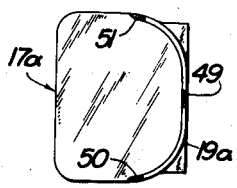
Figure 9 is a section of Figure 8 taken along line 9—9.
Figure 7:
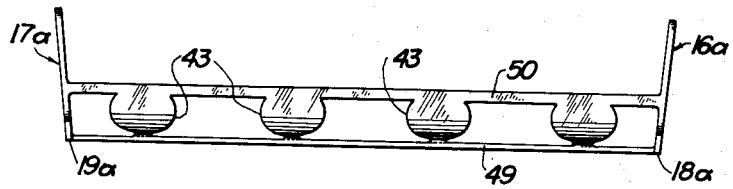
Figure 7 is a side view of a modified form of our invention.

In the form of our invention shown in Figures 7 to 9, the end walls 16a and 17a contain the flat base portions 18a and 19a, providing a stable support for the device. Instead of two continuous rail seats like those of the form first above described, there are two rows A and B of supporting walls, each row comprising a plurality of pads 43 and 44 serving as seat portions of concave, substantially circular or disc-like configuration, presenting seat surfaces 45 and 46. Said rows of seat portions are connected by transverse ribs 47 and 48 to the longitudinal supporting bar 49 the opposite ends of which are joined to the said end walls 16a and 17a. The upper portions of said seat portions 43 and 44 are connected to the upper longitudinal rails 50 and 51, respectively.

In this modification the individual seat elements 43 and 44 are adapted to constitute the major supports for fruit placed within the device. It has the functions and advantages of the first form described, but is considerably lighter, and is less costly because it contains less material.

Figure 10:
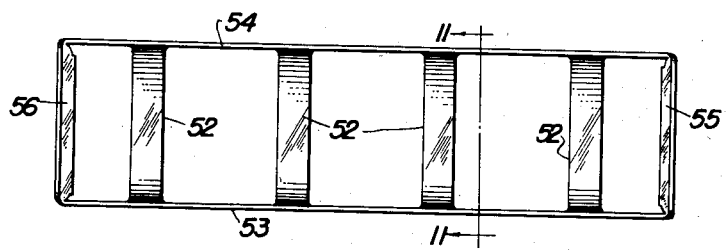
Figure 10 is a top view of another modification of our invention.
Figure 11:
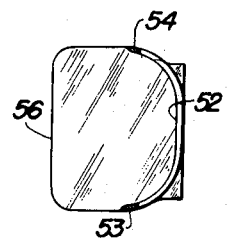
Figure 11 is a section of Figure 10 taken along line 11—11.

Figures 10 and 11 show still another modification in which there are a plurality of curved transverse seat elements 52 which join the side rails 53 and 54—the end walls 55 and 56 being substantially like those of Figures 7 to 9. The said seat elements and rails coact to support therein a row of fruit units placed within the container tray. This form of our invention has the advantage of comparatively low material and moulding cost.

Figure 12:
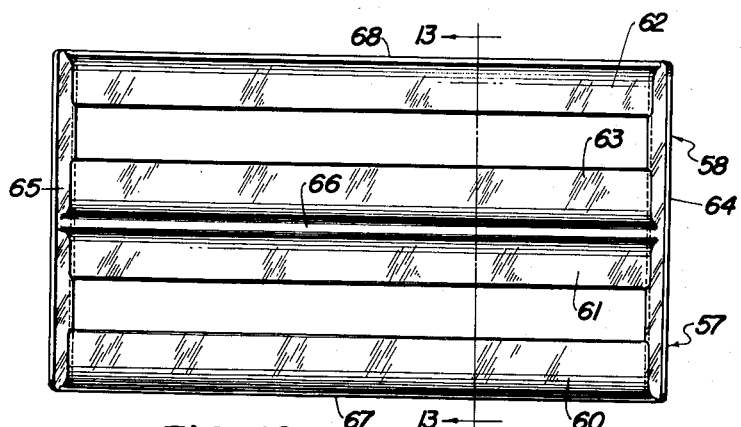
Figure 12 is a top view of still another form of our invention.
Figure 13:
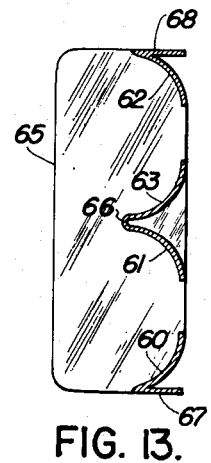
Figure 13 is a section of Figure 12 taken along line 13—13.
Figure 14:
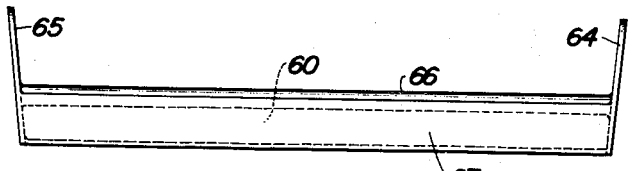
Figure 14 is a side view of Figure 12.

Figures 12 to 14 illustrate another form of our invention, substantially like that shown in Figures 1 to 5, except that there are two adjacent parallel sections 57 and 58, each having two spaced lateral supporting walls, to wit, walls 60 and 61, and 62 and 63, respectively, these being joined to end walls 64 and 65 which extend transversely across both of the said sections. It will be noted that walls 61 and 63 are joined at the longitudinal juncture portion 66, walls 60 and 62 being joined to side aprons 67 and 68 serving also as legs for the device. This presents a compact easily moulded form for accommodating two rows of fruit units, with the advantages above mentioned.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In a container tray of the type adapted to constitute part of a wrapped housing for a row of fruit units, two opposite upright end walls, and two lateral longitudinally extending rails joining said end walls at side portions thereof below the respective tops thereof, said rails having seat portions thereon for receiving lower portions of fruit units operatively disposed in the tray, said seat portions comprising a plurality of pads arranged in two longitudinal parallel spaced rows, whereby lower portions of said fruit units will be exposed to view through the spaces between said pads, transverse sections of said seat pads being of curved configuration presenting concave surfaces facing the interior of the tray, there being correspondingly positioned pads on opposite sides of the tray joined by relatively narrow transverse ribs, and a medial longitudinal supporting bar extending from said end walls and joining all of said ribs.

2. In a container tray of the type adapted to constitute part of a wrapped housing for a row of fruit units, two opposite upright end walls, two lateral longitudinally extending rails connected to said end walls at portions thereof below the respective tops of said end walls, and a plurality of spaced seat portions rigidly joined to said rails for receiving lower portions of fruit units operatively disposed in the tray, said seat portions comprising a plurality of spaced pads of substantially rigid material arranged in two longitudinal parallel correspondingly spaced rows, whereby lower portions of said fruit units will be exposed to view through the spaces between said pads, there being relative narrow transverse ribs joining opposite corresponding pads, transverse sections of said pads being of curved configuration presenting concave surfaces facing the interior of the tray.

References Cited in the file of this patent

UNITED STATES PATENTS

| Re. 17,279 | Copeman | Apr. 23, 1929 |
| D. 160,737 | Randall | Oct. 31, 1950 |
| 128,927 | Trissler | July 9, 1872 |
| 472,811 | Pickett et al. | Apr. 12, 1892 |
| 1,389,986 | Ristenpart | Sept. 6, 1921 |
| 1,625,754 | Tobita | Apr. 19, 1927 |
| 1,886,374 | Breton | Nov. 8, 1932 |
| 2,089,728 | Brogden | Aug. 10, 1937 |
| 2,119,773 | Buckner | June 7, 1938 |
| 2,368,797 | Bailar | Feb. 6, 1945 |
| 2,470,456 | Bailar et al. | May 17, 1949 |
| 2,556,590 | Long | June 12, 1951 |
| 2,649,991 | Woock | Aug. 25, 1953 |